(12) United States Patent
Von Hayn et al.

(10) Patent No.: US 9,132,815 B2
(45) Date of Patent: Sep. 15, 2015

(54) BRAKE ACTUATION UNIT FOR ACTUATING A MOTOR VEHICLE BRAKE SYSTEM

(75) Inventors: Holger Von Hayn, Bad Vilbel (DE);
Jurgen Schonlau, Walluf (DE);
Manfred Ruffer, Sulzbach (DE);
Thomas Sellinger, Offenbach (DE);
Torsten Queisser, Frankfurt (DE);
Lazar Milisic, Konigstein (DE)

(73) Assignee: Continental Teves AG & CO., OHG, Frankfurt (DE)

( * ) Notice: Subject to any disclaimer, the term of this patent is extended or adjusted under 35 U.S.C. 154(b) by 1497 days.

(21) Appl. No.: 11/997,774

(22) PCT Filed: Aug. 3, 2006

(86) PCT No.: PCT/EP2006/065032
§ 371 (c)(1),
(2), (4) Date: Feb. 4, 2008

(87) PCT Pub. No.: WO2008/014823
PCT Pub. Date: Feb. 7, 2008

(65) Prior Publication Data
US 2008/0217122 A1    Sep. 11, 2008

(30) Foreign Application Priority Data

Aug. 3, 2005 (DE) .................. 10 2005 036 458
Apr. 1, 2006 (DE) .................. 10 2006 015 193

(51) Int. Cl.
*B60L 7/00* (2006.01)
*B60T 8/40* (2006.01)
*B60T 7/04* (2006.01)

(52) U.S. Cl.
CPC ............... *B60T 8/4077* (2013.01); *B60T 7/042* (2013.01); *B60T 8/4081* (2013.01)

(58) Field of Classification Search
CPC ...... B60T 8/4077; B60T 8/4081; B60T 7/042
USPC .................... 303/20, 113.4, 155; 74/512, 513
See application file for complete search history.

(56) References Cited

U.S. PATENT DOCUMENTS 3,807,820 A * 4/1974 Schuhmann ................ 384/538
5,433,536 A * 7/1995 Bergling ..................... 384/620

(Continued)

FOREIGN PATENT DOCUMENTS

DE    19646781    4/1998
DE    10223799    5/2003

(Continued)

*Primary Examiner* — Vishal Sahni

(57) ABSTRACT

Disclosed is a brake actuation unit for actuating a 'brake-by-wire' type brake system for a motor vehicle. The brake system includes a brake booster operable via a brake pedal mounted on a shaft and via an electronic control unit depending on the driver's request, and an element to decouple a force-transmitting connection between the brake pedal and the brake booster in the 'brake-by-wire' operating mode. Also included are a device to detect a deceleration request of the driver, and a pedal travel simulator which interacts with the brake pedal and is formed of a simulator spring, which is arranged in terms of effect between a force-transmitting part connected to the brake pedal and a simulator housing, which is mounted on the shaft by means of two bearings. The simulator housing (22) includes a cylindrical area (26) for the accommodation of the two bearings (27, 28). This measure renders it possible to reduce the deformations that occur during actuation of the pedal travel simulator to a great extent.

12 Claims, 3 Drawing Sheets

(56) References Cited

U.S. PATENT DOCUMENTS

| | | |
|---|---|---|
| 6,253,635 B1 * | 7/2001 | Huber .............................. 74/512 |
| 6,571,661 B1 * | 6/2003 | Hemenway et al. ............ 74/512 |
| 2002/0117893 A1 * | 8/2002 | Shaw et al. ................. 303/113.4 |
| 2005/0001476 A1 * | 1/2005 | Kusano ....................... 303/113.4 |
| 2005/0057087 A1 * | 3/2005 | Ahnafield ....................... 303/20 |
| 2006/0163941 A1 * | 7/2006 | Von Hayn et al. ............. 303/155 |
| 2008/0017425 A1 * | 1/2008 | Albrichsfeld et al. ........ 180/65.2 |

FOREIGN PATENT DOCUMENTS

| | | |
|---|---|---|
| DE | WO2004005095 * | 1/2004 |
| DE | 102005049394 | 4/2006 |

* cited by examiner

BRAKE ACTUATION UNIT FOR ACTUATING A MOTOR VEHICLE BRAKE SYSTEM

This application is the U.S. national phase of international application PCT/EP06/65032 filed Aug. 3, 2006, which designated the U.S. and which claims the benefit of priority of German Patent Application Number 10-2006-015-193.3 filed Apr. 1, 2006 and German Patent Application Number 10-2005036-458.6 filed Aug. 3, 2005. The contents of each of the aforementioned documents are incorporated herein in their entirety.

BACKGROUND OF THE INVENTION

The present invention relates to a brake actuation unit for actuating a 'brake-by-wire' type brake system for a motor vehicle comprising:
- a brake booster operable both by means of a brake pedal mounted on a shaft and by means of an electronic control unit depending on the driver's request, with means being provided to decouple a force-transmitting connection between the brake pedal and the brake booster in the 'brake-by-wire' operating mode,
- means to detect a deceleration request of the driver,
- as well as a pedal travel simulator which interacts with the brake pedal and allows a resetting force acting on the brake pedal to be simulated in the 'brake-by-wire' operating mode independently of the actuation of the brake booster, and which can be connected in the 'brake-by-wire' operating mode when the force-transmitting connection between the brake pedal and the brake booster is decoupled and can be disconnected outside the 'brake-by-wire' operating mode, with the pedal travel simulator being formed of a simulator spring, which is arranged in terms of effect between a force-transmitting part connected to the brake pedal and a simulator housing which is mounted on the shaft by means of two bearings.

An actuation unit of this type is disclosed in DE 10 2005 049 394 A1. In order to impart a known brake pedal feel to the operator, the prior art actuation unit provides a simulator spring, which is configured as a flat bending spring. Means to produce a hysteresis are provided in addition. However, the mentioned publication does not allow taking any hints as to the mounting support of the simulator housing on the shaft of the brake pedal. It is feasible in a design of the pedal travel simulator, which basically comprises one simulator housing and two housing covers that close the housing, to arrange the bearings in the two simulator housing covers respectively, i.e. in two different components. Tension is encountered at the bearings and in the overall pedal travel simulator on account of manufacturing tolerances and variations in the positioning of the relevant parts.

In view of the above, an object of the invention is to further develop an actuation unit of the type mentioned hereinabove, wherein the forces that develop upon actuation of the pedal travel simulator can be reduced to a large extent. Another objective is to reduce the number of component parts required for the simulator housing.

SUMMARY OF THE INVENTION

According to the invention, this object is achieved in that the simulator housing includes a cylindrical area for the accommodation of the two bearings. This measure allows optimizing the mounting support of the simulator housing.

It is arranged in a favorable improvement that the simulator spring is designed as a flat bending spring which partly embraces the cylindrical area.

These measures render it possible to substantially minimize the size of the housing of the pedal travel simulator and to adapt it better to the limited mounting space conditions.

In another favorable improvement of the subject matter of the invention, the force transmission between the brake pedal and the pedal travel simulator is carried out by way of a friction member, which cooperates with a friction surface arranged in the simulator housing in order to produce a hysteresis and in which one end of the simulator spring is mounted.

In another especially favorable embodiment of the subject matter of the invention, a compressible element is provided for adjusting a progressive course of the brake pedal characteristic curve, with which element the friction member can engage after a predetermined distance has been covered.

The compressible element is preferably arranged at a holding member, which is adjustable in the simulator housing in the sense of setting the distance between the compressible element and the friction member.

In another favorable embodiment, the compressible element is arranged at a holding member, which accommodates the other end of the simulator spring and is adjustable in the simulator housing in the sense of setting the force of the simulator spring and the distance between the compressible element and the friction member.

Further features and advantages of the invention will be explained in detail in the following description making reference to the accompanying drawings by way of an embodiment.

DETAILED DESCRIPTION OF THE DRAWINGS

Figure 1:
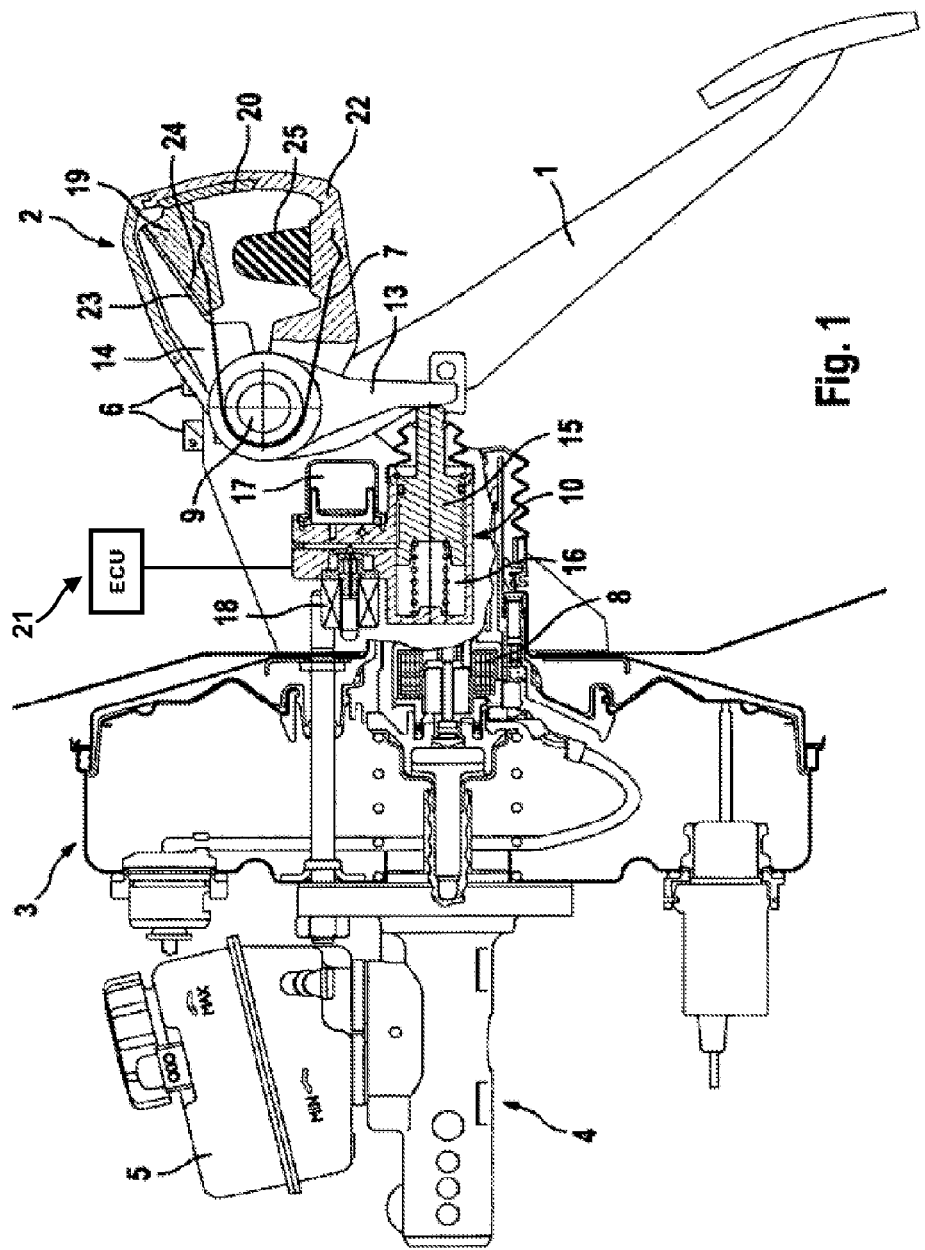
FIG. 1 is a simplified partial cross-sectional view of a design of the brake actuation unit of the invention.

The brake actuation unit shown in FIG. 1 in a partial cross-sectional view and intended for the actuation of a motor vehicle brake system of the 'brake-by-wire' type essentially comprises a brake booster, preferably a vacuum brake booster 3, a master brake cylinder connected downstream of the brake booster 3, preferably a tandem master cylinder 4, to the pressure chambers (not shown) of which wheel brakes (not shown) of a motor vehicle are connected, a pressure fluid supply tank 5 associated with the master brake cylinder 4, a brake pedal 1 for actuation of the brake booster 3 by the driver, a pedal travel simulator 2 which cooperates with the brake pedal 1 in particular in the 'brake-by-wire' operating mode and imparts the customary brake pedal feel to the driver, at least one sensor device 6 to detect a driver's deceleration request, as well as an electronic control unit 21, the output signals of which enable, among others, actuating an electromagnet 8 associated with the brake booster 3 and rendering it possible to actuate a pneumatic control valve independently of the driver's wish, the said control valve controlling the supply of air to the brake booster 3. An axial slot is provided between the end of a piston rod coupled to the brake pedal 1 and a control piston of the above-mentioned control valve, the said slot ensuring decoupling of the force-transmitting connection between the brake pedal 1 and the brake booster 3 in the 'brake-by-wire' operating mode. The pedal travel simulator 2 by which, as has been mentioned above, a resetting force acting on the brake pedal can be simulated in the 'brake-by-wire' operating mode irrespective of an actuation of the brake booster 3 is designed in such a fashion that it can be connected in the 'brake-by-wire' operating mode when the force-transmitting connection between the brake pedal 1 and the brake booster 3 is decoupled, and that it can be disconnected outside the 'brake-by-wire' operating mode. The pedal travel simulator 2 is actuated by means of a force-transmitting member 14 articulated at the brake pedal 1. The activation and deactivation of the pedal travel simulator 2 is executed in the embodiment shown by a hydraulic piston-and-cylinder assembly 10, which will be referred to in detail hereinbelow.

In the embodiment shown in FIG. 1, the pedal travel simulator consists of a simulator spring 7, which is compressed between the force-transmitting member 14 connected to the brake pedal 1 and the housing 22 of the pedal travel simulator 2. Connected to housing 22 is an arm 13, which is supported on the piston-and-cylinder assembly 10 mentioned before. The pressure chamber 16 of this piston-and-cylinder assembly 10 is connected to a hydraulic low-pressure accumulator 17 by means of a hydraulic connection. An electromagnetically operable valve 18 is inserted into the hydraulic connection and allows closing the mentioned connection. In the 'brake-by-wire' operating mode, valve 18 is closed so that neither the arm 13 nor the housing 22 of the pedal simulator can move. The simulator spring 7 is therefore compressed when the operator applies the brake pedal 1. The valve 18 is open outside the 'brake-by-wire' operating mode, and the simulator housing 22 will turn along with the brake pedal 1 when the brake pedal 1 is applied so that the force introduced by the operator is not absorbed in the pedal travel simulator 2 and rather acts upon the vacuum brake booster 3.

To produce a hysteresis, which generates friction forces with the increasing stroke of the pedal travel simulator 2 in addition to the simulator spring 7, the said friction forces counteracting the actuating force applied to the brake pedal 1, a friction member 19 that receives one end of the simulator spring 7 bears against the force-transmitting member 14 by the effect of the simulator spring 7. The friction member 19 cooperates with a friction surface 10. The abutment of the friction member 19 on the force-transmitting member 14 is by means of obliquely arranged abutment surfaces 23, 24 in such a way that a force component develops upon the actuation of the pedal travel simulator 2, which presses the friction member 19 against the friction surface 20. Serving for the adjustment of a progressive course of the force-travel characteristic curve of the brake pedal 1 is an elastic compressible element 25, with which the friction member 19 can be engaged.

Figure 2:
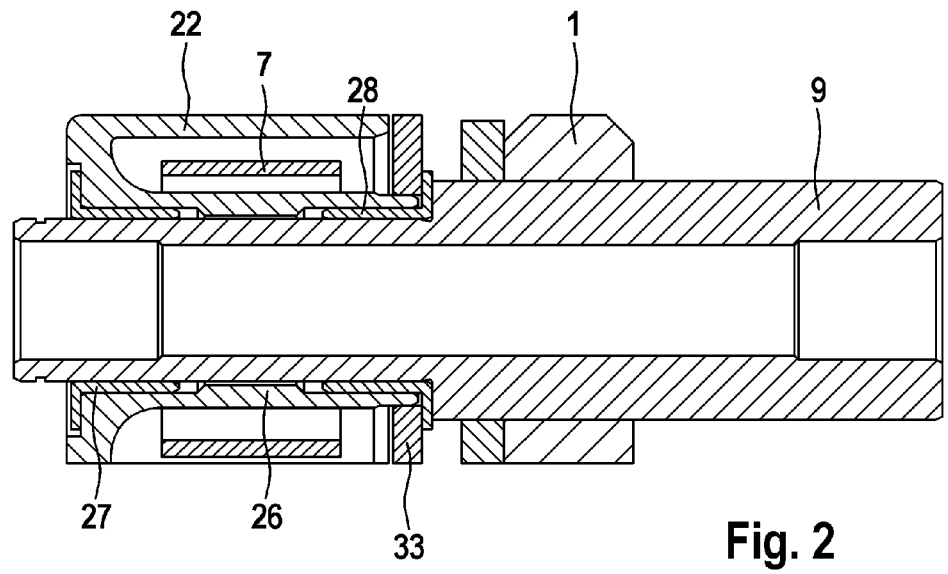
FIG. 2 shows a partial cross-sectional view of the mounting support of the pedal travel simulator illustrated in FIG. 1.

A shaft which is designated by reference numeral 9 serves as a mounting support for the brake pedal 1 and the simulator housing 22, as can be seen particularly in FIG. 2. For the mounting support of the simulator housing 22, the latter includes a cylindrical or tubular area 26 which accommodates two bearings 27, 28 spaced axially from one another. Manufacturing tolerances and positioning variations can both be reduced to a minimum due to the optimized mounting support of the simulator housing 22 where the bearings 27, 28 are associated with only one component part.

Figure 3:
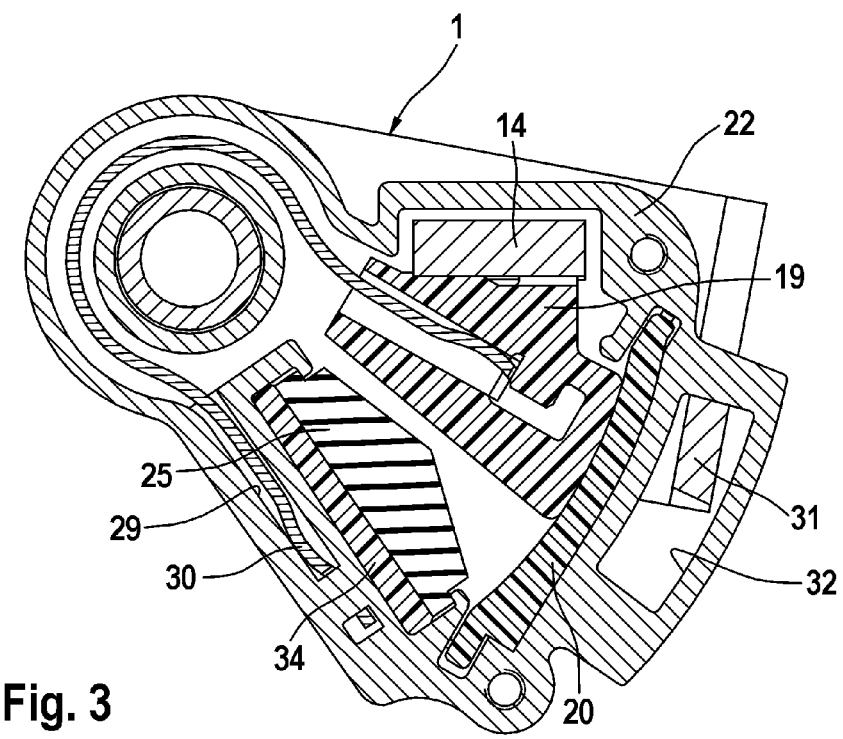
FIG. 3 is a cross-sectional view of another embodiment of the pedal travel simulator.

In the design of the pedal travel simulator 2 of the invention as illustrated in FIG. 3, the second end 30 of the simulator or flat bending spring 7 is received in a recess 29 in the simulator housing 22. In addition, a projection 31 is provided on the brake pedal 1 and cooperates with a recess 32 provided in the radially outward area of the simulator housing 22. As an alternative, the recess can also be arranged in a cover (not shown) closing the simulator housing 22 and being indicated using reference numeral 33 in FIG. 2. The compressible element 25 which has been mentioned with regard to FIG. 1 is arranged on a holding member 34 and is retained in the simulator housing 22 by means of suitable projections. Non-illustrated spacers can be used to adjust the distance between the friction element 19 and the compressible element 25.

Figure 4:
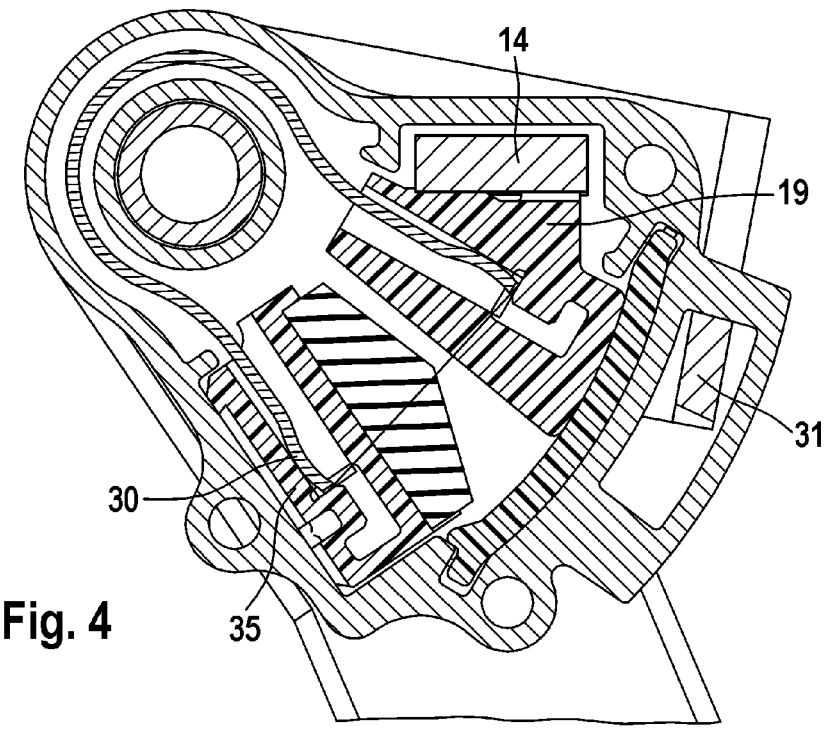
FIG. 4 is a cross-sectional view of still another embodiment of the pedal travel simulator.

The design of the other preferred embodiment of the pedal travel simulator 2 as depicted in FIG. 4 corresponds basically to the embodiment according to FIG. 3. The second end 30 of the simulator or flat bending spring 7 mentioned with regard to FIG. 3, however, is received in a holding member 35, the position of which in the simulator housing 22 can be adjusted by appropriate means both in the sense of altering the distance between the friction member 19 and the compressible element 25 as well as in the sense of altering the spring force generated by the simulator spring 7.

Figure 5:
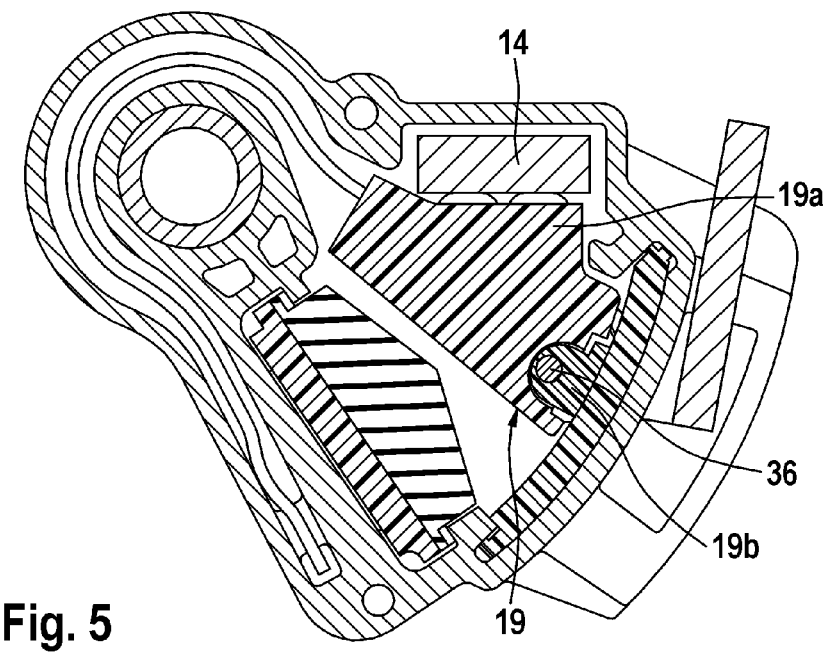
FIG. 5 is a cross-sectional view of a fourth embodiment of the pedal travel simulator.

In the fourth design version shown in FIG. 5, the arrangement of the simulator or flat bending spring 7 corresponds to the design of FIG. 3. However, the friction member 19 mentioned hereinabove has a two-part design and consists of a first friction segment 19a which cooperates with the force transmission member 14 and a second friction segment 19b, which is decoupled from the first friction segment 19a or is pivoted therein within limits, respectively. The mounting support of the second friction segment 19b is carried out using a pin 36. Canting or one-sided wear of the friction surfaces is prevented because the two friction segments 19a, a are decoupled from one another. What is also feasible is an arrangement not shown, in which the second friction segment is mounted in the first friction segment by means of a ball-and-socket joint. This arrangement serves for tolerance compensation in all directions.

The invention claimed is:

1. A brake actuation unit for actuating a 'brake-by-wire' type brake system for a motor vehicle comprising:
    a brake booster operable via a brake pedal mounted on a shaft and via an electronic control unit depending on a request from a driver, with an element provided to decouple a force-transmitting connection between the brake pedal and the brake booster in the 'brake-by-wire' operating mode;
    a detector for detecting a deceleration request of the driver;
    a pedal travel simulator which interacts with the brake pedal and which allows a resetting force acting on the brake pedal to be simulated in the 'brake-by-wire' operating mode independently of the actuation of the brake booster, and which can be connected in the 'brake-by-wire' operating mode when the force-transmitting connection between the brake pedal and the brake booster is decoupled and can be disconnected outside the 'brake-by-wire' operating mode, with the pedal travel simulator being formed of at least one simulator spring, which is operatively arranged between a force-transmitting member connected to the brake pedal and a simulator housing which is mounted on the shaft by two bearings, wherein the simulator housing includes a cylindrical area for the accommodation of the two bearings, and wherein the force transmission between the brake pedal and the simulator spring is carried out by way of a friction member, the friction member compresses the simulator spring and at the same time the friction member slides along a friction surface arranged in the simulator housing, thereby generating a friction force which is additional to the simulator spring force in order to produce a hysteresis and in which one end of the simulator spring is mounted in the friction member.

2. A brake actuation unit as claimed in claim 1, wherein the simulator spring is designed as a flat bending spring which partly embraces the cylindrical area.

3. A brake actuation unit as claimed in claim 1, wherein a compressible element is provided for adjusting a progressive course of the brake pedal force-travel characteristic curve, with which element the friction member can engage after a predetermined distance has been covered.

4. A brake actuation unit as claimed in claim 3, wherein that the compressible element is arranged at a holding member, which is adjustable in the simulator housing in the sense of setting the distance between the compressible element and the friction member.

5. A brake actuation unit as claimed in claim 3, wherein the compressible element is arranged at a holding member, which receives the other end (30) of the simulator spring and is adjustable in the simulator housing in the sense of adjusting the force of the simulator spring and the distance between the compressible element and the friction member.

6. A brake actuation unit as claimed in claim 1, wherein the friction member has a two-part design and consists of a first friction segment which cooperates with the force transmission member and a second friction segment, which is decoupled from the first friction segment and is pivoted within limits in the first friction segment.

7. A brake actuation unit as claimed in claim 6, wherein a second friction segment is mounted in the first friction segment by means of a ball-and-socket joint.

8. A brake actuation unit as claimed in claim 1, wherein arranged in the outside area of the simulator housing or a simulator housing cover is a stop, which cooperates with a stop element provided at the brake pedal in the sense of limiting the brake pedal actuating travel.

9. The brake actuation unit as claimed in claim 1, wherein an entire area for accommodating each of the two bearings is cylindrical.

10. The brake actuation unit as claimed in claim 1, wherein a relative movement between the force-transmission member and the friction member is caused by a lateral force component.

11. The brake actuation unit as claimed in claim 1, wherein the friction member cooperates with the friction surface.

12. The brake actuation unit as claimed in claim 1, wherein an abutment of the friction member on the force-transmitting member is by obliquely arranged abutment surfaces such that a force component develops upon actuation of the pedal travel simulator which presses the friction member against the friction surface.

* * * * *